(No Model.)
C. C. TAINTOR.
SAW SET.
No. 452,399. Patented May 19, 1891.
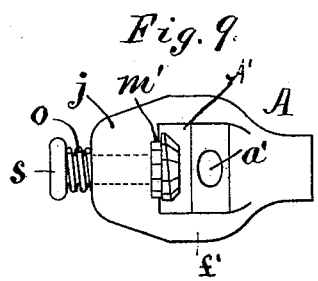
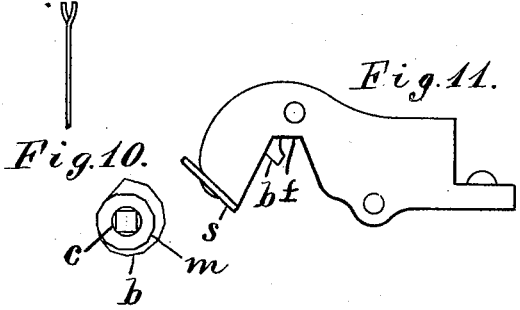
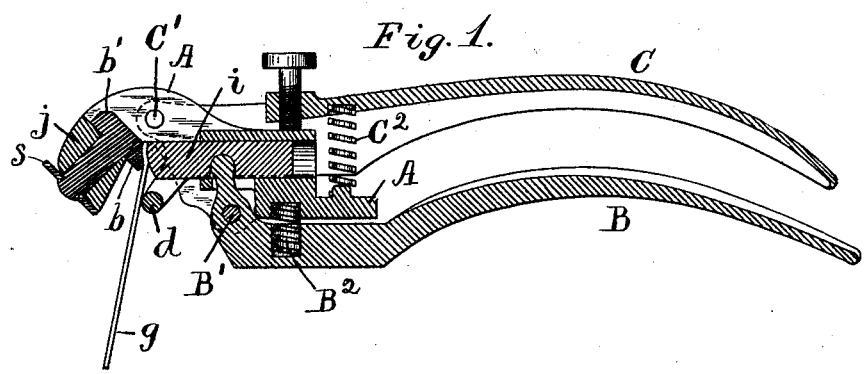
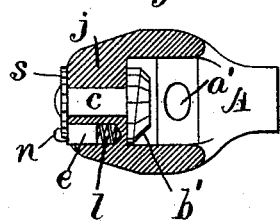
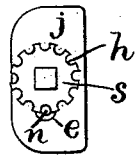
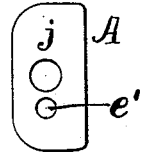
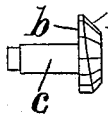
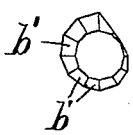
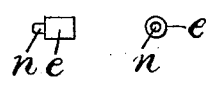
Attest:
L. Lee
J. Van Mal Jr.
Inventor.
C. C. Taintor, per
Crane & Miller, Attys.

UNITED STATES PATENT OFFICE.

CHARLES C. TAINTOR, OF ELIZABETH, NEW JERSEY, ASSIGNOR TO THE TAINTOR MANUFACTURING COMPANY, OF NEW YORK, N. Y.

SAW-SET.

SPECIFICATION forming part of Letters Patent No. 452,399, dated May 19, 1891.

Application filed December 29, 1890. Serial No. 376,097. (No model.)

*To all whom it may concern:*

Be it known that I, CHARLES C. TAINTOR, a citizen of the United States, residing at Elizabeth, Union county, New Jersey, have invented certain new and useful Improvements in Dies for Saw-Sets, fully described and represented in the following specification and the accompanying drawings, forming a part of the same.

The object of this invention is to provide a means for bending the tooth of a saw for a greater or less distance from the point, according to the pitch of the teeth.

My improvements relate partly to the arrangement of a rotary die having a series of beveled facets of different lengths to operate with a reciprocating punch and partly to other features of construction hereinafter described and claimed.

In the annexed drawings, Figure 1 is a longitudinal section of a saw-set provided with my rotary die. Fig. 2 is a section through the head. Fig. 3 is an end view of the head, showing a setting-disk and spring stop-pin. Fig. 4 represents the end of the head with the disk and stop-pin removed. Fig. 5 is a side view of the rotary die. Fig. 6 is an end view of the same. Fig. 7 is a side view, and Fig. 8 an end view, of the stop-pin. Fig. 9 is a plan of the head, viewed in the same direction as in Fig. 2, showing a modified means for adjusting the rotary die, and Fig. 10 is an end view of the spindle and die as shown in Fig. 9. Fig. 11 is a side view of the head, and Fig. 12 is a cross-section of a saw with the teeth set by a convex punch.

The invention is shown herein applied to the saw-set described in my application, Serial No. 370,677, filed November 7, 1890; and it consists in a head A, upon which a punch-lever B is pivoted at B', and a bending-lever C, carrying a bending-jaw $d$, is pivoted at C'.

The head A is provided with a vertical aperture A', at the forward end of which is a cross-bar $j$.

The setting-punch $i$ is fitted movably to a socket $a'$ in the head and is movable toward the cross-bar.

The rotary die $b$ is pivoted in the cross-bar by a spindle or shank $c$, and is provided at its outer end with a setting knob or disk $s$.

The series of facets $b'$ is formed upon the corner of the die at the same angle with the shank $c$ and at the same distance from its center and projecting therefrom in different 55 degrees for operating upon teeth of different lengths. The shank is arranged in the head at a suitable angle or inclination (about forty-five degrees) to bring the facets transverse to the end of the punch, so that the saw may be clamped between the punch and die, and the inner edge of each facet is arranged upon a line with the top of the punch, at which level notches $f$ are formed in the opposite side bars $f'$ of the head, as shown in Fig. 11, to rest upon the edge of the saw-blade, and thus set the top of the teeth even with the top of the punch, as is indicated by the saw-blade $g$ in Fig. 1. Such notches form the saw-gage for the edge of the blade. The facets are formed in a gradually lengthening series, so that the rim of the die is of spiral form, as shown in Fig. 6.

The longest facet is shown adjacent to the punch in Fig. 1, and the levers B and C are shown provided with springs $B^2$ and $C^2$, which are so adjusted that the compression of the levers first forces the punch forward to clamp the saw-tooth against the die, and then presses the bending-jaw $d$ against the saw-blade to set the teeth, as shown in Fig. 1.

It is immaterial to my invention whether or not the tooth is clamped before bending, as the punch is frequently operated in a different manner in other saw-sets.

Any of the facets may be readily turned in opposition to the punch $i$, and when thus turned may be locked by any suitable means, as by a spring-stud $e$, having pin $n$, fitted to notches $h$ in the setting-disk $s$. The pin is shown fitted in a socket $e'$ adjacent to the shank $c$ in the head A, with a spring $l$ to press it normally outward. The setting-disk is released from the pin by pushing the same inward with the thumb-nail, when the disk may be turned to adjust the desired facet opposite the punch.

In Figs. 9 and 10 the die is shown provided upon its rear side with a polygonal hub $m$, fitted to parallel seats $m'$ in the inner side of the bar $j$ of the head.

A spring $o$ is shown fitted between the setting-disk s and the head to hold the hub normally in contact with the seats; but the die may be readily pushed forward by compressing the spring, and may then be rotated into the proper position, and the hub then retracted between the seat m' to hold it in the adjusted position.

In Fig. 1 the facet opposite to the punch is shown with a concave face, and the end of the punch is made convex to fit the same.

By this construction the saw-tooth is not only bent from the plane of the blade g, but its cutting edge or corner is placed substantially parallel with the blade, so as to form a tangent with the sides of the saw-kerf to make a smoother cut.

By making the inner corners of all the facets at the same distance from the center of the die-shank, as is shown in Fig. 6, the die requires no adjustment to or from the saw gage or guide; but the inner corner of each facet corresponds therewith when it is turned opposite the punch, as is clearly shown in Figs. 1 and 11. The saw-gage also requires no adjustment to and from the punch or the facets, and is cheaply formed by merely cutting the notches f in the bars f' at the opposite sides of the opening A'. As the body of the die is inclined backward from the teeth of the saw and the means for adjusting it are applied to the outer end of the die-shank, there is no obstruction to direct inspection of the teeth, nor any obstruction to the light falling clearly upon the die, the punch, and the tooth which is operated upon.

The axis of the die being inclined to bring the facets perpendicular to the stroke of the punch thus affords an opportunity for seeing the work, which is much superior to that afforded by those constructions in which an adjustable die is used, the body of which is over its operative face.

Having thus set forth the nature of my invention, what I claim herein is—

1. The saw-set comprising the head A, formed with vertical opening A' and front cross-bar j, the rotary die with facets of unequal length, having a shank c pivoted obliquely in the cross-bar, a punch fitted to a socket a' in the head and movable to and from the facets, notches f in the side bars of the head to form gages for the saw-teeth, the gages and the upper side of the punch being arranged in line with the inner ends of the facets, and a punch-lever pivoted to the head for operating the punch, substantially as herein set forth.

2. A saw-set comprising the head A, the rotary die having a series of inclined facets of unequal length, with a shank pivoted obliquely in the head and provided with means for setting the die, the punch i, the gage-notches f upon the under side of the head in line with the top of the punch and the inner ends of the facets, the lever B for actuating the punch, and the lever C for bending the tooth over the outer corner of the facet, the whole arranged and operated substantially as set forth.

In testimony whereof I have hereunto set my hand in the presence of two subscribing witnesses.

CHARLES C. TAINTOR.

Witnesses:
THOS. S. CRANE,
HENRY J. MILLER.